Patented Feb. 22, 1944

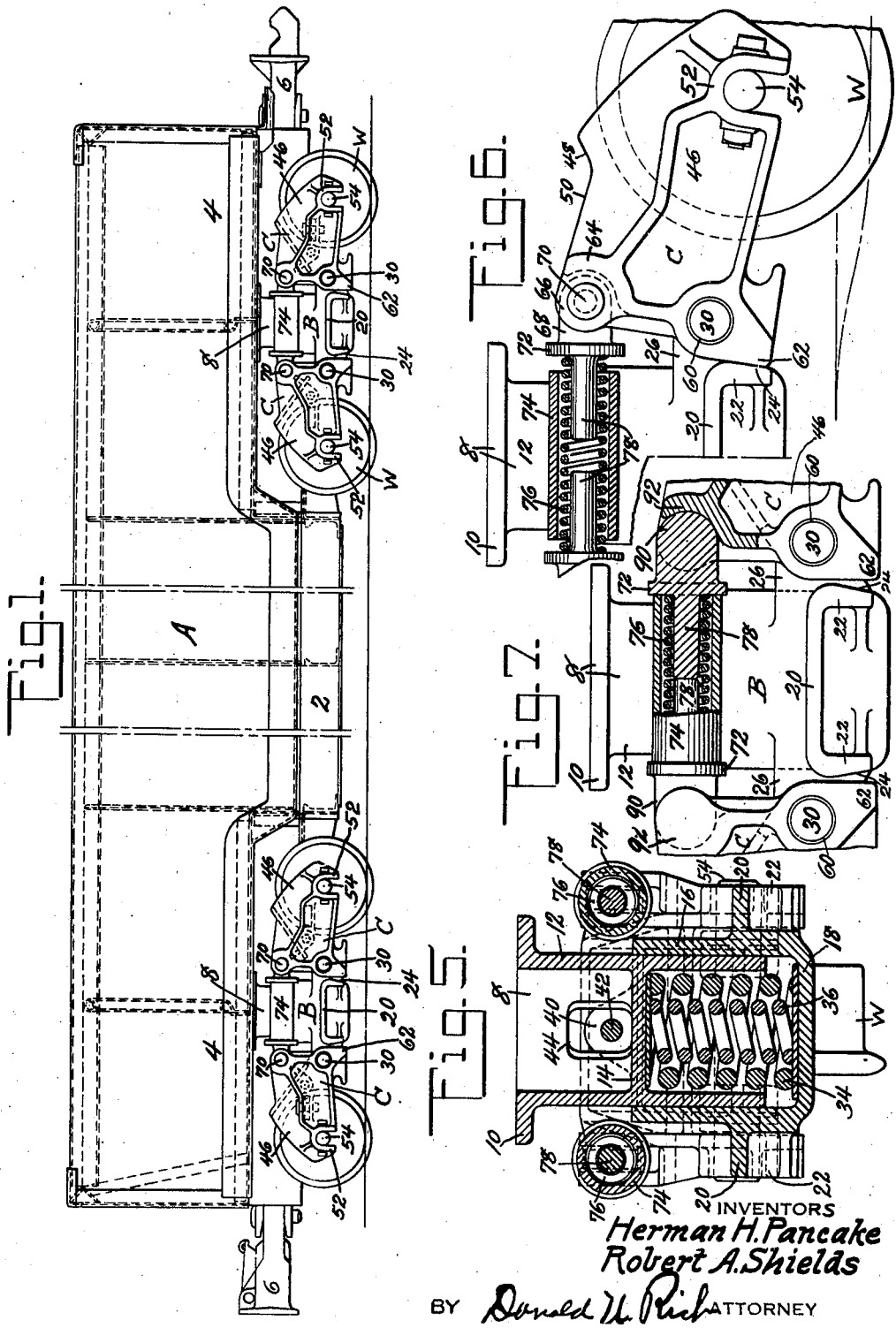

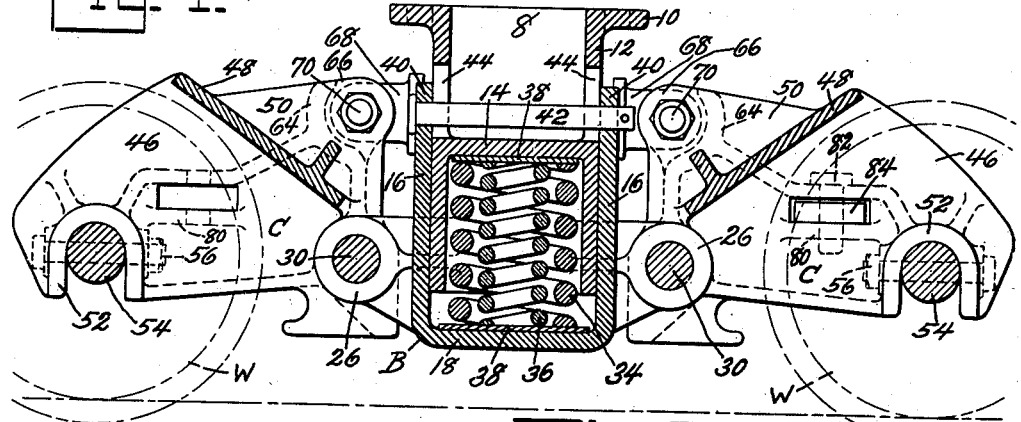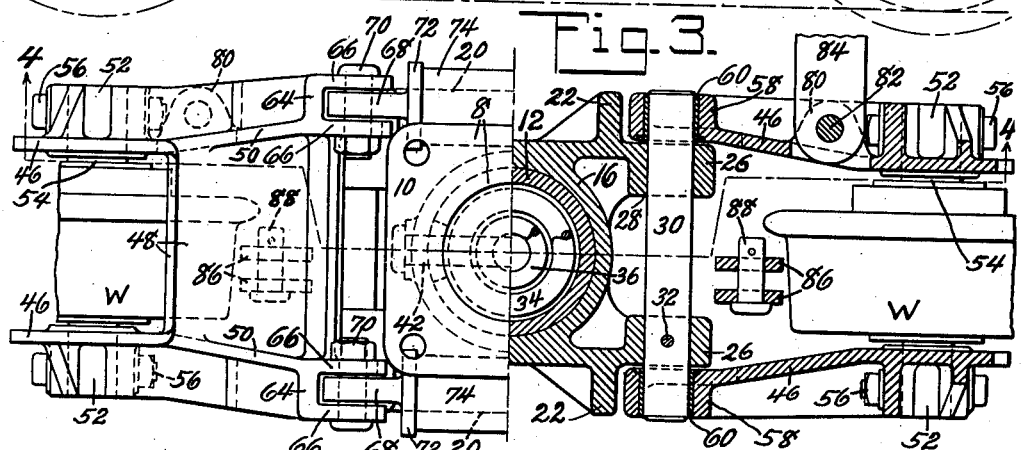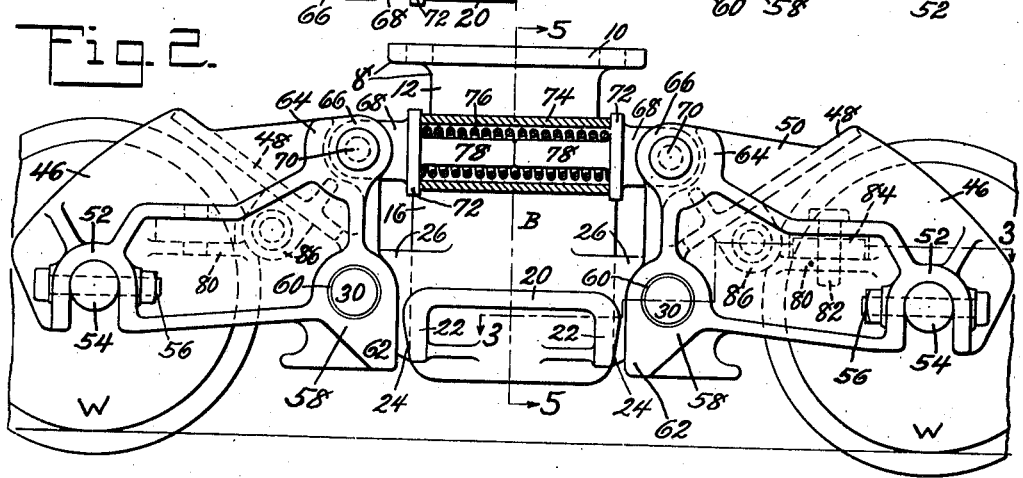

2,342,484

UNITED STATES PATENT OFFICE 2,342,484

CAR TRUCK

Herman H. Pancake, Huntington, W. Va., and Robert A. Shields, Berwick, Pa., assignors to American Car and Foundry Company, New York, N. Y., a corporation of New Jersey Application August 7, 1941, Serial No. 405,746

10 Claims. (Cl. 105—179)

This invention relates to car trucks in general and in particular to trucks used on mine or other industrial cars subjected to rough rail conditions.

The bulk of mine and industrial cars have been built in the past with a more or less rigid wheel and axle assembly carried by a rigid body. Such construction was satisfactory as long as the distance between axles could be maintained comparatively close, but as soon as it was desired to increase the body capacity which necessitated spreading the axles, then trouble was experienced due to derailments. The derailments were caused by the rigid body riding on three wheels with the fourth wheel flange being permitted to clear the rail, thus derailing the car. Derailment not only slowed up production but subjected the car bodies to severe twisting strains which eventually would cause failure of car body parts. It is an object, therefore, of the present invention to provide a car truck which is extremely flexible and which will materially assist in preventing derailments due to the car riding at three points.

Another object of the invention is the provision of a car truck resiliently mounted for vertical movement as well as swinging movements relative to a substantially vertical axis.

A further object of the invention is the provision of a car truck having wheel frames movable relative to each other to equalize the loads between the wheels.

A still further object of the invention is the provision of a car truck having equalizing wheel frames resiliently urged toward the rails yet limited in their movement by stops, which stops will also limit the equalization of the wheel frames.

These and other objects of the invention will be apparent to persons skilled in the art from a study of the following description and accompanying drawings, in which:

Figure 1 is an elevational view showing a car equipped with the improved trucks;

Fig. 2 is an enlarged elevational view of a car truck with parts broken away to better disclose the construction;

Fig. 3 is a plan view of the improved truck with one-half in section taken on line 3—3 of Fig. 2;

Fig. 4 is a sectional view taken on line 4—4 of Fig. 3;

Fig. 5 is a sectional view taken on line 5—5 of Fig. 2;

Fig. 6 is a half elevational view similar to Fig. 2 but showing the relation of parts when the wheels are in a depression, and, Fig. 7 is a partial view of the truck similar to Fig. 2 but showing a slight modification of the equalizing link.

Referring now to the drawings in detail, it will be seen that the car body A is supported upon four trucks, two of which are shown, and which trucks each comprises a truck center cup B to which are connected wheel frames C. The car body may be of any desired construction but as shown is of the maximum capacity type having an extremely low central portion 2 raised at each end and side as at 4 to accommodate the trucks. Any suitable couplings 6 may be attached to the body for connecting the cars in the train. The car body is provided at four points beneath the raised floor portion thereof with body center bowls or hollow king pins 8. Each of these body center bowls is provided with a horizontally disposed car supporting and attaching flange 10 merging into and suitably braced with a cylindrical depending portion 12. This cylindrical depending portion has formed therein a ledge 14 placed as high as possible in the cylindrical portion in order to provide an inverted cup like part of as great a depth as possible.

The truck center cup or bowl B, previously referred to, is preferably formed as an integral casting having a main centrally disposed cylindrical portion 16 closed at the bottom by a wall 18, thereby forming an upwardly directed cup or bowl of considerable depth adapted to closely surround the cylindrical portion of the body center bowl or hollow king pin. The truck center cup member is provided on either side thereof with laterally extending projections 20 generally inverted channel shape in cross-section and with the downwardly directed flanges 22 suitably braced to the truck center bowl and having their outer surfaces 24 inclined for a purpose later to be referred to. Also projecting laterally from the cylindrical main central portion of the truck center cup are spaced ears 26 having openings 28 formed therein and adapted to receive transversely extending horizontal pins 30 fastened in the ears by pins or cotters 32. As clearly shown in Fig. 3 the projecting ears 26 and stops 20 are integrally tied together and to the cylindrical portion of the truck center bowl. As previously stated the cylindrical portion of the body center bowl or hollow king pin fits within the cylindrical truck center cup or bowl, thus permitting the truck to rotate about the body center bowl or hollow king pin. In order to support the load imposed on the truck by the body center bowl outer and inner springs 34 and 36 respectively are supported at their lower ends upon walls 18 and bear at their upper ends on walls 14. These springs may bear directly on the walls but, as clearly shown in Figs. 4 and 5, hardened wear plates 38 are interposed between the spring ends and the adjacent bowl bottom. In order to lock the truck center cup or bowl to the body center bowl, ears 40 are formed on the truck center bowl and adapted to receive a bolt or pin 42 extending through the ears and through vertically and horizontally enlarged slots 44 formed in the body center bowl or hollow king pin above the shelf or bottom 14. Thus it will be seen that the truck center cup or bowl and the body center cup or bowl are nested and held together for both vertical movement and horizontal oscillation.

The wheel frames C, previously referred to, are preferably cast in one piece with side pieces 46 joined together by a web 48 extending between the side pieces and reinforced by an upstanding rib 50. Each side piece is formed adjacent its outer lower edge with an inverted U-shaped portion 52 suitably braced to the side piece and adapted to receive the ends of axles 54 held in place by bolts 56, thus it will be seen that the side pieces of each wheel frame are tied together by a web and by the axles and that the side pieces must accordingly act in unison to resist thrusts imposed thereon by the flanges of wheels W which carry the axles. The inner lower portion of each wheel frame side piece is provided with an enlargement 58 having an opening therein to receive a hardened bushing or bearing member 60 mounted on the ends of pins 30, thereby pivotally mounting the wheel frames upon the truck center cup member. Each of the enlargements 58 is extended downwardly as at 62 to provide a surface adapted to contact surface 24 of the stop members of the truck center cup or bowl, thereby limiting the pivotal action of the wheel frames in a downward direction. Each wheel frame is also provided with upstanding spaced ears 64 suitably braced to the frame side pieces and fitted with spaced portions 66 adapted to receive the ends 68 of equalizer links which are pivotally connected to the upstanding ears of the wheel frames by bolts or pins 70. Each of the equalizer links consists of an end portion, previously referred to, which merges into a cylindrical shoulder 72 serving as a spring seat and adapted to contact, under certain conditions, the ends of a tube 74. Located within the tube and bearing upon shoulders 72 is a kick-down spring 76 held in position by the tube as well as by projecting ends 78 extending outwardly from the shoulders 72. The projecting ends 78 and tube 74 are made of the same length in order that they will act in unison to prevent opposed shoulders 72 from approaching each other beyond a certain point predetermined by choice of the lengths of tube 74 and projections 78. The kick-down spring 76 is a comparatively light spring and its sole function is to urge shoulders 72 apart and while it will support a small fraction of the load, it is not to be considered as a load carrying spring. Each of the wheel frames is provided with one side piece having a projecting ear 80 adapted to receive a pin 82 extending through the ear, through one of the bracing ribs and through the ends of a tie bar 84. As shown in Fig. 3, only one tie bar is used and in many cases will be sufficient, but in other cases where the truck is subjected to extremely hard usage and the curves are not too sharp an additional tie bar may be used to assist in controlling the truck's movement and provision has been made for such tie bar. Also as clearly shown in Figs. 2 and 3 the wheel frames are provided with ears 86 depending from the web portions and adapted to receive brakes hung on pins 88 (Fig. 3).

In some cases it may be desirable to dispense with pins 70 which are loaded in double shear and cause the ends of the equalizer links to bear directly upon the wheel frames as shown in Fig. 7. In this slight modification the ends of the equalizer links are rounded as at 90 and adapted to fit in socket portions 92 formed in an upstanding wall extending between the wheel frame side pieces and suitably braced to the webs of the wheel frames. The remainder of the structure shown in Fig. 7 is the same as that previously described and accordingly the same reference numerals have been used.

The operation of the truck is believed to be obvious but since a description of the operation may be helpful it will now be given. As previously stated, the kick-down springs 76 are not load carrying springs and accordingly the shoulders 72 will be in contact with tube 74 and the projections 78 will also be in contact, thus in effect the equalizer links of each truck are rigid compression ties between the wheel frames, and when one wheel strikes a slight hump in the rail, it will be raised upwardly rotating about its pivot pin 30 and transmitting a direct compression through the equalizer links to the other wheel frame on the truck and thence to the other wheel, which wheel will act as a fulcrum and its wheel frame will be rotated upward slightly thus transmitting the compressive thrusts of the equalizer link to the truck center cup. Accordingly the truck center cup will be lifted approximately half the height of the hump in the rail and both wheels will be subjected to identical loads neglecting, of course, the slight friction in the various pin connections. The upward movement of the truck center cup or bowl will be resisted by the main load carrying springs 34 and 36 which support the car body. As the car goes into a curve the trucks will be guided by their wheel flanges and will rotate with respect to the car body about the body center bowl or hollow king pin, such rotative motion being permitted by a slight wrapping action of the load springs or by a sliding of the bearing plates 38 in the cup or bowl members. The trucks at adjacent ends of the car are tied together by the tie bars and accordingly must act in unison in their horizontal oscillating movements about the hollow king pin. In case one wheel reaches an excessive depression in the rail or leaves the rail its wheel frame will immediately be urged downwardly under the combined action of the adjacent wheel frame and the kick-down spring until such time as the stop 62 contacts stop ledge 22. Further downward rotation of this unsupported wheel frame will be impossible and accordingly the equalizing link will prevent any upward rotation of the adjacent wheel frame and thus the car body may under exceptional or emergency conditions be supported by one wheel only. In this manner dangerous derailments are avoided and a digging in of the derailed wheel is prevented since it is relieved of load. Such a downward limiting position of a wheel frame is shown in Fig. 6 but in this figure the equalizing link is not solid as it would be in cases where the adjacent wheel (not shown) were carrying load. In the condition shown by Fig. 6 both wheels are in a depression and the wheel frames have dropped downwardly under their own weight and under action of kick-down springs 76. Such a position of parts may arise where a low point in the rails is reached by one truck and the car body tends to be supported on three points, namely, on the other three trucks. Under these conditions the kick-down springs 76 will maintain the wheels and their flanges in engagement with the rail, thereby preventing derailments.

From the preceding description of the truck and its operation it will be seen that the car body is floated on a plurality of load carrying springs located substantially concentric with the vertical axis about which the trucks may turn in taking a curve. Also due to the pivoting of the wheel frames on the truck center bowl and the provision of equalizer links, the wheel frames may oscillate in a vertical direction equalizing the loads within predetermined limits controlled by the stop arrangement. The provision of the kick-down springs insures that the wheels will be forced at all times and with equal pressures onto the rail, while the stops will limit the amount of kick down and prevent digging in of the trucks in case of derailment.

While the invention has been described more or less in detail, it will be obvious to persons skilled in the art that various modifications and rearrangements of parts may be made and all such modifications and rearrangements of parts are contemplated as will fall within the scope of the appended claims defining our invention.

What is claimed is:

1. A mine or similar rail car comprising a lading body having a floor and side walls, downwardly open body center bowls secured to said body adjacent each side and end of the floor, upwardly open truck center bowls interfitted with said body center bowls and capable of vertical sliding and horizontal rotation relative thereto, resilient means located within said bowls and resiliently supporting said body center bowls upon said truck center bowls, a pair of wheel frames pivotally connected to each truck center bowl for vertical swinging movements relative thereto, wheels and axles supporting the outer portions of said wheel frames remote from the truck center bowl, and an equalizer link having pivotal connection with the inner portions of said wheel frames and acting in compression to support the center bowls and inner portions of the wheel frames.

2. A car as defined in claim 1 in which said equalizer link includes spring seats, a spring bearing on said spring seats and a tube surrounding said spring and normally engaging portions of said seats to render the spring inactive, said spring becoming active and forcing said seats away from said tube only when the load on the associated truck center bowl reaches a predetermined minimum.

3. A car as defined in claim 1 in which said equalizer link is composed of separable parts normally in abutment and normally acting solely as a compression link but separable and movable relative to each other when the load on the associated truck center bowl reaches a predetermined minimum.

4. A car as defined in claim 1 in which said equalizer link comprises a spring and separable parts normally in abutment to limit the compression on said spring, said spring separating said parts whenever the load on the associated center bowl reaches a predetermined minimum.

5. A car as defined in claim 1 in which said equalizer link is composed of a plurality of parts acting solely in compression to support the load on the center bowls and to cause said wheel frames to swing in unison about their pivotal connections to the truck center bowl when the load on said bowl is above a predetermined amount, said parts moving relative to each other to swing the wheel frames relative to each other about their pivotal connection to the truck center bowl when the load is below said predetermined amount.

6. A car as defined in claim 1 in which said truck center bowl is formed with stops and said wheel frames are formed with lugs to engage said stops and limit the vertical swinging movements of the wheel frames.

7. A car as defined in claim 1 in which said truck center bowl and wheel frames are formed with stops to limit the vertical swinging movement of the wheel frames, said stops being so constructed and arranged as to cause one wheel of the truck to carry the entire load on the truck in case of derailment or breakage of the other wheel of the truck.

8. A car supporting structure adapted to run on rails and including a center bowl adapted to receive a load, wheel frames pin connected at their inner ends to opposite sides of said center bowl on substantially the outer ends of said center bowl, wheels carried by said wheel frames, a multi-part equalizer link having parts thereof pivotally connected to said wheel frames at points removed from said pin connections and normally acting solely in compression as a rigid strut to support said center bowl substantially in fixed relationship to said rails and to rotate said wheel frames in unison about said pins, and resilient means carried by said multi-part equalizer link and constantly exerting pressure to separate the link parts and force said wheels onto said rails.

9. A car supporting structure adapted to run on rails and including spaced wheel and axle assemblies, wheel frames each supported at its outer end on a wheel and axle assembly, a load carrying structure pivotally connected to the inner ends of said wheel frames and serving as a tension link joining the frames together, a multi-part equalizer link pivotally connected to said wheel frames at points remote from said first named pivotal connection and serving as a normally rigid compression link between said wheel frames whereby the entire structure is supported on the wheels in substantially fixed relationship to said rails, and resilient means carried by said multi-part equalizer link and constantly exerting pressure tending to separate the parts of said link.

10. A car supporting structure adapted to run on rails and including a center bowl adapted to receive a load, wheel frames pivotally connected at their inner ends to opposite sides of said center bowl on substantially the outer ends of said wheel frames, wheels carried by said frames, an equalizer link pivotally connected to said wheel frames at points removed from said first named pivotal connections, said equalizer link comprising a plurality of separable parts normally in abutment and acting as a rigid strut solely in compression to support said center bowl and to rotate said wheel frames in unison about their pivotal connections with said center bowl, and resilient means carried by said equalizer link and constantly urging said separable parts away from each other to thereby force said wheels onto said rails.

HERMAN H. PANCAKE
ROBERT A. SHIELDS.